United States Patent [19]

Kubik

[11] Patent Number: 5,778,669
[45] Date of Patent: Jul. 14, 1998

[54] HYDRAULIC POSITIONING SYSTEM WITH INTERNAL COUNTERBALANCE

[76] Inventor: Philip A. Kubik, 1527 Lochridge Rd., Bloomfield Hills, Mich. 48302

[21] Appl. No.: 386,451

[22] Filed: Feb. 10, 1995

Related U.S. Application Data

[63] Continuation-in-part of Ser. No. 360,639, Dec. 21, 1994.

[51] Int. Cl.$^6$ .................................................. F15B 11/02
[52] U.S. Cl. .................................................. 60/413; 60/372
[58] Field of Search ............................ 60/413, 415, 372

[56] References Cited

U.S. PATENT DOCUMENTS

| | | | |
|---|---|---|---|
| 2,325,138 | 7/1943 | Kyle et al. | 60/372 X |
| 3,653,208 | 4/1972 | Kubik . | |
| 3,956,891 | 5/1976 | Karazija | 60/413 |
| 4,046,270 | 9/1977 | Baron et al. | 60/413 X |
| 4,198,820 | 4/1980 | Roth et al. | 60/372 X |
| 4,347,049 | 8/1982 | Anderson | 60/372 X |
| 4,669,266 | 6/1987 | Kubik . | |
| 4,738,101 | 4/1988 | Kubik | 60/413 |
| 4,751,818 | 6/1988 | Kubik . | |
| 4,796,428 | 1/1989 | Hall | 60/413 |
| 5,048,292 | 9/1991 | Kubik | 60/413 |
| 5,102,161 | 4/1992 | Williams | 60/415 X |

Primary Examiner—Edward K. Look
Attorney, Agent, or Firm—Young & Basile, P.C.

[57] ABSTRACT

A fluid system is connected to a three chamber fluid cylinder. The effective pressure responsive areas of two of the pressure chambers are equal such that when fluid at a selected rate of flow and at a predetermined pressure is communicated to one of the chambers, a force of a predetermined magnitude is generated to cause contraction of the fluid cylinder at a predetermined rate. A servo valve is disposed in the system between the inlet and outlet of a fluid pump to selectively direct fluid to either of the equal pressure chambers to selective expand or contract the fluid cylinder. The fluid system further comprises an accumulator and a directional control valve adapted to communicate a third chamber of the fluid cylinder to the accumulator. The accumulator maintains the pressure in the third fluid chamber to exert a force on the fluid cylinder balancing a selected load that the cylinder may be carrying during the expansion and contraction stages of the cylinder.

8 Claims, 2 Drawing Sheets

HYDRAULIC POSITIONING SYSTEM WITH INTERNAL COUNTERBALANCE

This application is a continuation-in-part of Ser. No. 08/360,639 filed Dec. 21, 1994.

FIELD OF THE INVENTION

The present invention relates to a fluid system for providing a counter balance for a single rod equal displacement fluid cylinder and particularly for using a servo valve.

BACKGROUND OF THE INVENTION

Heretofore fluid systems have been employed for controlling the rate of movement of hydraulic motors and, in particular, systems which have a single rod piston that has equal pressure responsive areas. An example of such a cylinder and system for operating the cylinder is disclosed in my U.S. Pat. No. 4,738,101 issued Apr. 19, 1988. There are a variety of applications when it is desirable to have a piston with only one piston rod.

A common requirement in many hydraulic systems is that the piston of a reciprocatory fluid motor is employed in a lift system as in raising and lowering substantial automation equipment. Another separate hydraulic lift is then used to counterbalance the pressure so that the lift system is utilized only for the force of lifting. It is desirable for accomplishing this result by employing a system having a servo valve and a single rod three chamber cylinder wherein the third chamber for the cylinder functions as the counterbalance.

One disadvantage of servo valves is that the fluid experiences a large pressure drop across the valve which causes inefficiency in the hydraulic system. Therefore, it is desirable to provide a hydraulic system wherein an auxiliary counterbalance system provides a separate hydraulic lift to counterbalance the pressure of the lift system so that the fluid does not flow through a servo valve, and therefore is not subject to the pressure drop inherent with the servo valve. The result is a more efficient lift system.

The single rod three chamber cylinder referred to above in my patent includes two chambers to which equal area piston surfaces are exposed at the rod end side and the head end side of the piston. A third chamber hydraulically isolated from the first two chambers is exposed to a third area on the piston which faces the head end side of the piston. This particular type of cylinder is well adapted to apply pressure during the forward stroke for lifting equipment as well as balancing the load by supplying fluid under pressure to act against the third area. There is no known method of using a servo valve in a positioning system to drive a three chambered cylinder as described above such that the third cylinder area functions as the counterbalance.

SUMMARY OF THE INVENTION

The present invention is directed to a hydraulic system having a single rod piston of a three chamber cylinder controlled by a servo valve for lifting, lowering and positioning of automated equipment, and an auxiliary system for counterbalancing the load through the third unequal area of the cylinder.

It is an additional object of the invention to be able to utilize a smaller servo valve which improves response and accuracy to direct the fluid flow as a result of having a smaller valve pressure responsive area of the cylinder during the lifting, lowering and positioning functions.

In accordance with the present invention the two equal area chambers of a single piston rod three chamber cylinder are connected via a servo valve to the outlet of a main system pump and a sump. The servo valve is a conventional variable position valve which in its centered position blocks fluid to the chambers of the cylinder.

A third chamber is selectively communicated to a fluid accumulator when pressure fluid is being communicated to either the first or second pressure chambers such that pressure in the third fluid chamber is maintained at some predetermined level for counterbalancing the load carried by the fluid cylinder throughout both expansion and retraction of the fluid cylinder.

It is therefore an additional object of the present invention to provide a fluid cylinder that has an integral accumulator/counterbalance system for balancing the load carried by the fluid cylinder during its retraction and expansion stages.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWING

The description herein makes reference to the accompanying drawing in which.

DESCRIPTION OF THE PREFERRED EMBODIMENT

Figure 1:
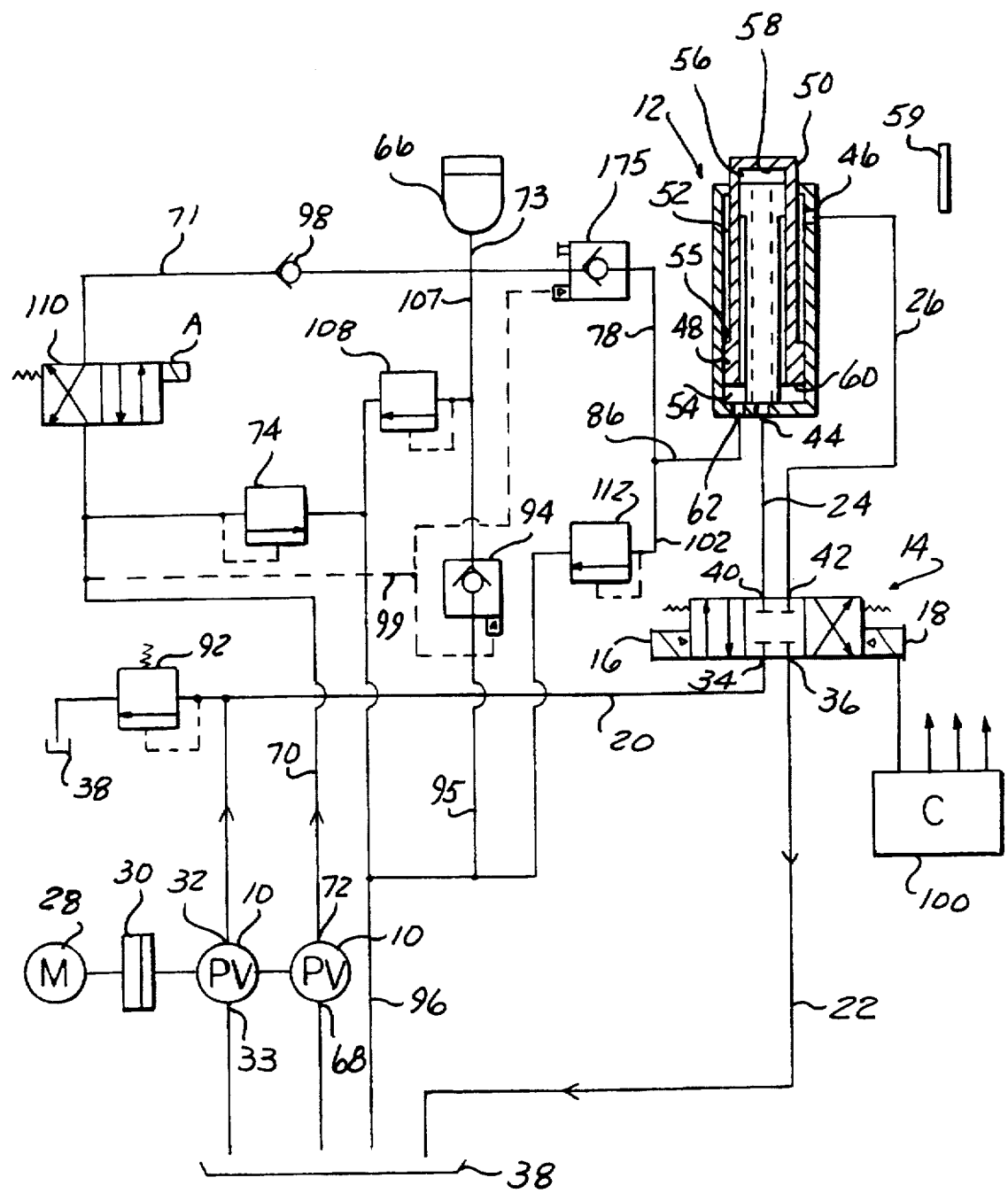
FIG. 1 is the schematic illustration of the present invention in the form of a fluid system and a single fluid cylinder.

Referring now to FIG. 1, there is illustrated a main circuit comprising a main variable displacement pump 10 connected in a open loop fashion by conduits to a single piston fluid cylinder 12. Incorporated in the main circuit is a conventional servo valve 14 having solenoids 16 and 18 which operate the servo valve 14 in a conventional manner. Specifically, the servo valve 14 is adapted to variably connect conduits 20 and 22 selectively to the conduits 24 and 26 or to be positioned as shown closed/center to prevent communication between the conduits 20 and 22, with 24 and 26. The pump 10 is a variable displacement pump whose displacement may be controlled in a known manner. While a variable displacement pump 10 is illustrated, a fixed displacement pump may also be used. A prime mover, such as an electric motor schematically illustrated at 28 is mechanically connected through a suitable coupling device 30 to the drive shaft of the pump 10.

The main system pump 10 has an outlet 32 connected via conduit 20 to a pressure port 34 of the servo valve 14 and has an inlet side 33 connected to a sump or reservoir 38. The return port 36 of valve 14 is connected via conduit 22 to sump 38. When the servo valve 14 is in its normal centered position, (neither of solenoids 16 or 18 being energized), the ports 34 and 36 are blocked and allow no flow therethrough. The control ports 40 and 42 are isolated from the pressure and return ports 34 and 36 of servo valve 14 when the valve is in its illustrated centered position.

Port 40 is connected via a conduit 24 to the head end port 44 of cylinder 12 and the other control port 42 is connected via conduit 26 to the rod end port 46 of the cylinder 12. Cylinder 12 is of a known construction and is explained in more detail and may be had by reference to U.S. Pat. Nos. 4,751,818 and 5,048,292 which are incorporated here by reference. The cylinder 12 is shown schematically having a piston 48 slidably received within the cylinder with a single piston rod 50 projecting from the rod end of cylinder 12. Piston 48 divides the interior of the cylinder 12 into a rod end chamber 52 and a first head end chamber 54. The piston 48 and the cylinder 12 are constructed as to define within the cylinder 12 a second head end chamber 56 which is hydraulically isolated within the cylinder from chambers 52 and 54. An area indicated at 58 at the head end side of the piston is exposed to fluid pressure within second head end chamber 56, and this area is equal to the area 55 of the piston exposed to rod end chamber 52. These two areas are referred to as "equal areas" hereinafter while the area 60 of piston 48 exposed to chamber 54 is hereinafter referred to as the third area. The cylinder 12 is constructed so that equal areas 58 and 55 are individually a smaller proportion than the third area 60. The ratio of one equal area to the third area can vary per specific bore size and application of the cylinder 12. The equal area 58 plus the unequal area 60 equals the total area defined by the bore size of the cylinder. The cylinder is provided with rod and head end ports 46, 44 respectively communicating with chambers 52 and 56, and a third port 62 in communication with chamber 54.

The counterbalance system includes an accumulator 66 which is charged via a solenoid actuated valve 110 connected via conduit 70 to the outlet 72 of counterbalance system pump 64. Valve 110 is connected to the accumulator 66 via conduits 71, 73, a one way check valve 98 being located in conduit 71 to accommodate flow through conduit 71 only in a direction toward accumulator 66. Accumulator 66 communicates with counterbalance conduit 86 via a conduit 78 having a pressure actuated valve 175. Valve 175 is held open when a minimum pressure is present in the outlet conduit 70 of pump 64 and its branch conduit 99 which is connected to valve 175. Thus at all times when counterbalance pump 64 is being driven, normally there is a free and unrestricted communication between accumulator 66 and the counterbalance chamber defined by chamber 54 within cylinder 12 so that fluid can freely flow in either direction to maintain a substantially constant pressure in the counterbalance chamber 54 as the piston 50 moves upwardly and downwardly in its working cycle.

If pump 64 should stop, valve 175 would seat upon the loss of pressure in branch conduit 99, thus trapping the fluid in conduit 86 and the counterbalance chamber defined by area 54. Should the pressure in conduit 86 rise beyond the predetermined pressure, a relief valve 112 and conduit 102 would open to permit fluid in conduit 86 to flow through conduit 102 and valve 112 to a discharge conduit 96 which drains to sump 38.

Valve 94 is similar in function to valve 175 except that valve 94 will be allowed to open upon the loss of pressure in conduit 99 thereby reducing pressure in accumulator 66 when motor 28 is shut off. Valve 108 will automatically open when the pressure in conduit 107 exceeds a predetermined pressure above the maximum accumulator pressure. Valve 175 may be selectively opened to bleed conduit 86 if the counterbalance pump 64 is not in operation.

A control unit 100 electrically connects all the solenoids and systematically controls the energization of the various valves. To avoid confusion by incorporating extra connecting conduits, FIG. 1 shows the control unit 100 only connected to solenoid 18, although control unit 100 is actually connected to all the solenoids.

Overload relief valves 92, 74 and 108 are operatively connected as overload relief valves respectively, for the main pump 10, auxiliary pump 64 and, accumulator 66. If an overload condition occurs, the relief valves 92, 74 and 108 vent fluid to the sump 38.

Many conventional components, such as filters, oil coolers, pressure gages, etc. have not been shown in FIG. 1 in that these components are conventional and do not directly influence the circuit operation. The circuit of FIG. 1 does, however, include a check valve 98 in conduit 71 oriented to block fluid flow from the accumulator 66 back to the feed pump 64.

A conventional position sensor 59 determines the position of the end of rod 50 and that position information is used in the conventional manner to provide an operating signal to the servo valve 14.

The circuit as shown in FIG. 1 indicates that all of the valve operating solenoids are in their normal deenergized state. If placed in the "rest" position, rod 50 is retracted, ready to be extended from the cylinder 12. Solenoid A on valve 110 is energized to allow fluid flow from pump 64 to top off the accumulator 66, if necessary. Valve 14 remains deenergized in the "rest" position.

In operation, when it is desirable to direct fluid from pump 10 through conduit 20, the servo valve 14 and conduit 24 to accelerate piston rod 50 to be driven upwardly in a rapid advanced movement, the control unit 100 is actuated, into an advance state in which solenoid 16 is energized. Solenoid A of valve 110 will be deenergized.

Energization of solenoid 16 will variably shift valve 14 to connect port 34 to port 40 and port 36 to port 42 as necessary to control fluid flow in the conventional manner. With these fluid connections established, main pump 10 supplies fluid under pressure through ports 34 and 40 of valve 14 to conduit 24 and thence to the head end port 44 of cylinder 12 to act against the head end equal area 58 of rod 50. The rod end equal area chamber 52 of cylinder 12 will be connected via port 46, conduit 26, ports 42 and 36 of the valve 14 and return conduit 22 to the sump 38. The volume of fluid pumped by main pump 10 into head end chamber 56 of cylinder 12 against the head end equal area 58 of rod 50 is equal to the volume of fluid expelled by the rod end equal area 55 from chamber 52 and returned to the sump 38. This gives the most controllable servo valve arrangment.

While fluid is flowing via conduit 24 to the pressure chamber 56 to expand cylinder 12, a predetermined pressure rate of change is maintained in the chamber 54 by means of accumulator 66 to counterbalance any selected load that is carried by cylinder 12, i.e. the weight of the equipment being operated by cylinder 12. Fluid from accumulator 66 flows at counterbalance pressure through pilot operated check valve 175 and into third area chamber 54 as piston 48 moves upwardly in response to pressure fluid applied from main pump 10. In this manner, the accumulator system acts as a counterbalance.

The high pressure fluid from pump 10 acts only on the head end area 58 as fluid flows into chamber 56. As a result, cylinder 12 functions as though it is a smaller cylinder having a bore size equal to head end area 58. A smaller cylinder offers the advantages of lower high speed flow to move piston 48 rapidly upwardly as viewed in FIG. 1. In addition, a smaller cylinder allows a smaller servo valve 14 be used in the circuit than is used with a larger cylinder, because of the lower volume of fluid to be transmitted through the valve 14 for a given rate of cylinder rod travel. A smaller valve provides more precise control than a larger valve. The rate of change of piston rod 50 is controlled by the servo valve 14 by means of input from controller 100.

The positioning of the working stroke of rod 50 will be sensed by position sensor 59 and a signal from control unit 100 can move servo valve 14 to a no-flow condition (as shown in FIG. 1) to prevent fluid flow either to or from cylinder chambers 52 and 56 to maintain piston rod 50 at the desired position. When the system is started, accumulator 66 is fully pressurized by pump 64. Fluid is moving freely in either direction in counterbalance conduit 86 between accumulator 66 and third chamber 54 within cylinder 12 to maintain substantially constant pressure in the counterbalance chamber as piston 50 moves upwardly and downwardly in its cycle.

When the control unit 100 is subsequently actuated to return piston 48 to its original position, the control unit 100 energizes solenoids 18 and deenergized solenoid 16 for the return function.

With solenoid 18 energized, valve 14 is shifted to variably connect its cross connections with the valve ports to connect port 42 with 34 and port 40 with port 36. Port 34 is thus connected to port 42 and port 36 is connected to port 40 so that main pump 10 supplies fluid under pressure to rod end chamber 52 and fluid is discharged from head end chamber 56 to the sump 38. During the return phase of operation, fluid (oil) flows through conduit 86, check valve 175 to conduit 73 which leads to accumulator 66. As rod 50 moves downwardly during the return stroke, the third area 60 of the piston 48 expels fluid from the third chamber 54 of cylinder 12, and all of this fluid is connected via conduit 86, valve 175 and conduit 78 to accumulator 66 to recharge the accumulator. Pump 64 via directional control valve 110 will maintain the accumulator 66 at the desired pressure when cylinder 12 is in the "rest" or fully retracted position. When the cylinder 12 is in a fully retracted position, (rest) servo valve 14 is deactivated and directional control valve 110 is activated, that is, servo valve 14 is moved to the center (blocked) position while Solenoid A is energized so that valve 110 is moved to connect conduit 70 to conduit 71. Therefore, the accumulator 66 is connected to counterbalance pump 64 output to be topped off, if necessary.

Servo valve 14 is capable of partially opening the valve passages to establish a selectively adjusted flow rate to and from the equal area chamber and the third area chambers of cylinder 12. The servo valve may be controlled by appropriate programming of controller 100 which receives position information from a sensor 59.

It should be noted that during the initial high speed extension of the piston rod 50, the third pressure chamber 54 is supplied with a counterbalance pressure with fluid from the accumulator 66 functioning as a make up system to offset the vertical component of static load. Because the fluid from the accumulator does not flow through a servo valve to get to chamber 54, the fluid is not subject to a pressure drop that is inherent in a system with a servo valve. This allows for a more efficient system.

Figure 2:
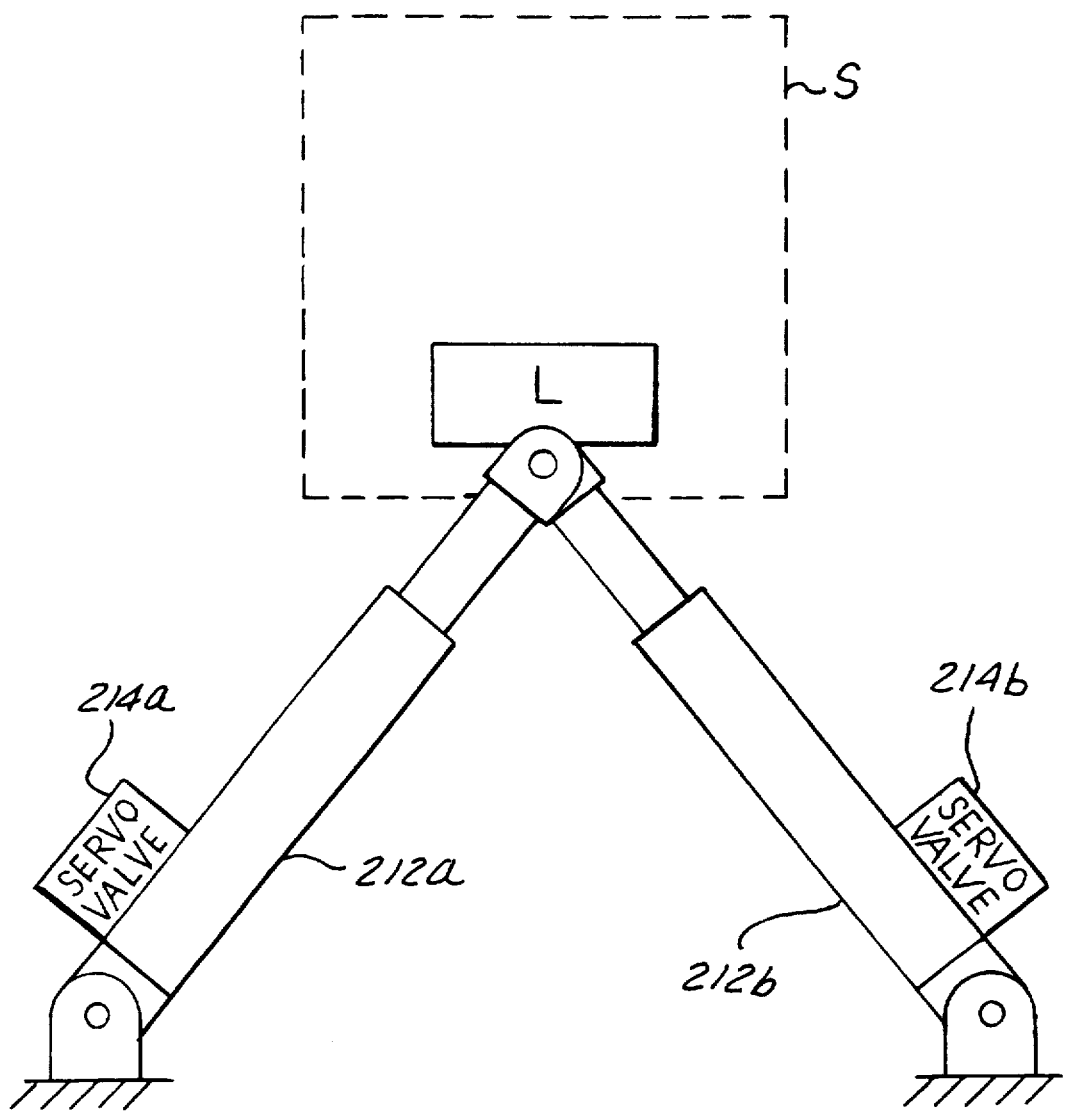
FIG. 2 is a schematic diagram of a dual cylinder arrangement for positioning a load.

FIG. 2 shows a dual cylinder 212a, 212b arrangement which together position a load L within a space area S. An example where such an arrangement would be used is in a flight simulation apparatus. This arrangement provides for the servo valves 214a and 214b to be mounted on the respective cylinders 212a, 212b. The proximity of the servo valve to the cylinder provides an arrangement which reduces and minimizes the effect of the bulk modulus of fluid in the system by reducing the contained oil volume.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. For example, it would be within the scope of the invention to substitute a proportional directional control valve in place of the servo valve in situations where less positioning accuracy is required.

What is claimed is:

1. A hydraulic circuit for selectively positioning a single vertical rod piston operatively disposed in a hydraulic cylinder having three cylinder chambers, said piston having equal areas on its rod side and its head end side respectively exposed in first and second chambers of said cylinder, and a third area on its head end side exposed in the third chamber of said cylinder;

said circuit comprising a main pump for pumping fluid through said circuit and connected only to said first and second chambers of the hydraulic cylinder via a proportional control valve, and a second pump connected only to said third chamber of the hydraulic cylinder via a two position valve;

an accumulator communicating with and disposed downstream of the two position valve and selectively maintaining fluid in the third chamber;

means for selectively directing fluid pressure from said main pump to and from said first and second chambers in an open loop fashion at a predetermined load, wherein said cylinder expands and contracts; and actuating means for connecting the accumulator to the third chamber and to maintain a substantially constant pressure in the third chamber at a predetermined value to exert a force for counterbalancing the load during the expansion and contraction of the cylinder.

2. The circuit defined in claim 1 wherein when the hydraulic cylinder is at rest in a retracted position, the secondary pump communicates with the accumulator to charge said accumulator.

3. The circuit defined in claim 2 further comprising control means for controlling said proportional control valve and said two position valve, said control means being operable to position said two position valve in its first position when said hydraulic cylinder is at rest in a retracted position.

4. The circuit defined in claim 3 wherein when the hydraulic cylinder is at rest in an expanded position, the proportional control valve is in a non-flow position and the accumulator is in communication with the third chamber to maintain a substantially constant pressure in said third chamber.

5. A hydraulic circuit for selectively positioning a single vertical rod piston operatively disposed in a hydraulic cylinder having three cylinder chambers, said piston having equal areas on its rod side and its head end side respectively exposed in first and second chambers of said cylinder, and a third area on its head end side exposed in the third chamber of said cylinder;

said circuit comprising a main pump for pumping fluid through said circuit and connected only to said first and second chambers of said hydraulic cylinder via a proportional control valve, and a second pump connected only to said third chamber of said hydraulic cylinder via a two position valve;

an accumulator communicating with and disposed downstream of the two position valve and selectively maintaining fluid in the third chamber;

means for selectively directing fluid pressure from said main pump to and from said first and second chambers in an open loop fashion at a predetermined load, wherein said cylinder expands and contracts;

actuating means to maintain pressure in the third chamber at a predetermined value to exert a force for counterbalancing the load during the expansion and contraction of the cylinder; and a pressure actuated valve disposed between the accumulator and the third chamber.

6. The circuit defined in claim 5 wherein a first conduit connects the second pump to the accumulator and a second conduit connects the accumulator to the third chamber, and the two position valve is disposed in the first conduit and the pressure actuated valve is disposed in the second conduit.

7. The circuit defined in claim 6, wherein the pressure actuated valve is open when pressure is present in the first conduit.

8. The circuit defined in claim 6, wherein the pressure actuated valve is seated when the second pump stops to maintain pressure in the second conduit.

* * * * *